No. 699,968. Patented May 13, 1902.
P. Z. McDONALD.
EYEGLASSES.
(Application filed Nov. 17, 1900.)
(No Model.)

Witnesses
Harry B. E. White
Ray White

Inventor:
Percy Z. McDonald
By L. W. Hopkins Attorney.

THE NORRIS PETERS CO., PHOTO-LITHO., WASHINGTON, D. C.

UNITED STATES PATENT OFFICE.

PERCY Z. McDONALD, OF CHICAGO, ILLINOIS.

EYEGLASSES.

SPECIFICATION forming part of Letters Patent No. 699,968, dated May 13, 1902.

Application filed November 17, 1900. Serial No. 36,916. (No model.)

*To all whom it may concern:*

Be it known that I, PERCY Z. MCDONALD, a citizen of the United States, residing at Chicago, in the county of Cook and State of Illinois, have invented certain new and useful Improvements in Eyeglasses, of which the following is a specification.

The present invention relates to that class of eyeglasses in which an intermediate portion of the bow-spring is disposed horizontally, or practically so, and in front of the general plane of the lenses, so as to be out of contact with the nose, and has for its object the provision of an improved bow-spring of this class. Heretofore in eyeglasses of this class the bow-spring has been disposed in the horizontal plane of the boxes, and in order to give it the necessary elasticity it has been provided near its ends with loops which extend beyond the inner ends of the lenses. This arrangement is objectionable because, first, it requires a box of special construction, and, secondly, the loops bring the intermediate portion of the spring an objectionable distance from the bridge of the nose.

According to my present invention the bow-spring has a broad but thin horizontal or practically horizontal intermediate portion which is straight or practically straight when considered horizontally and is located above the horizontal plane of the boxes and in front of the vertical plane of the lenses, the broader surfaces of this intermediate portion of the spring being vertical, (parallel with the plane of the lenses,) so that it may be bent in its own horizontal plane, while it is practically inflexible in a vertical plane. The spring is provided in the vertical plane of the boxes with depending portions which lie in the vertical plane of the lenses and which enter the boxes at top, as in eyeglasses in which the entire bow-spring lies in the vertical plane of the lenses.

The invention consists in the features of novelty that are hereinafter described, and in order that it may be fully understood I will describe it with reference to the accompanying drawings, which are made part hereof, and in which—

Figure 1:
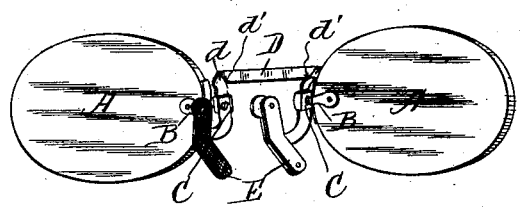
Figure 2:
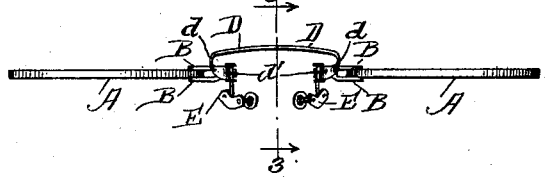
Figure 3:
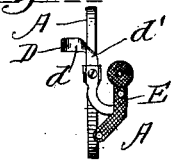
Figure 4:
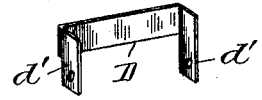
Figure 5:
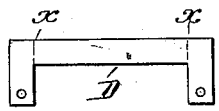

Figure 1 is a perspective view of a pair of eyeglasses embodying the invention and viewed from the rear side. Fig. 2 is a plan view thereof. Fig. 3 is a vertical section through the center of the bow-spring. Fig. 4 is a perspective view of a bow-spring of modified form. Fig. 5 is a plan view of the blank from which the spring shown in Fig. 4 is made.

A represents the lenses, B the posts, and C the boxes, all of which may be of customary construction, the boxes, however, being of necessity open at top.

D is the bow-spring, the intermediate portion of which is horizontal, or approximately so, and lies above the horizontal plane of the boxes and in front of the vertical plane of the lenses, the broader faces of said intermediate portion being vertical, or practically so, so that in the process of spreading the guards for applying the glasses to the nose said intermediate portion will bend in its own horizontal plane and at the same time resist flexure in a vertical plane. At the extremities of this intermediate portion the bow-spring has rearwardly-bent portions $d$, and beyond these rearwardly-bent portions it has depending portions $d'$, that lie in a plane back of the intermediate portion and are adapted to enter the boxes from the top in customary manner. Preferably the intermediate portion is straight as viewed from in front (horizontally) and slightly curved as viewed from above; but this is not essential, and, if desired, it may be perfectly straight as viewed from above, as shown in Fig. 4. Preferably also the spring is twisted between the extremities of its intermediate portion and the extremities of its depending portions $d'$, as shown in Figs. 1, 2, and 3, the entire spring in this case being formed of a perfectly straight strip of metal; but in its broadest aspect my invention is not limited in this respect, and, if desired, the spring may be of the form shown in Fig. 4, which has no twist, the depending portions being in the form of tongues proceeding downward from the rearwardly-bent portions $d$, the whole being formed of a blank, such as is shown in Fig. 5. This blank consists of a straight strip of metal having at its ends lateral projections, and in order to form the bow-spring shown in Fig. 4 it is simply necessary to bend it upon the dotted lines $x$.

When the spring is to be made of gold, the form shown in Figs. 1, 2, and 3 is preferable; but when it is to be made of steel the form shown in Fig. 5 is preferable, because of the difficulty that would be experienced in twisting a steel spring to the form shown in Figs. 1, 2, and 3. The form shown in Figs. 1, 2, and 3 also has the advantage of greater elasticity, while the form shown in Figs. 4 and 5 has the advantage of positively preventing the lenses from moving relatively to each other in their own plane, or, in other words, in a plane which is transverse to the optical axes of the lenses, this movement of the lenses being objectionable in glasses having cylindrical lenses.

In the drawings I have shown the glasses as being provided with what are known in the trade as "anatomical" guards E. The peculiar features of an anatomical guard are that they offset rearwardly and comprise a main pad which is practically unyielding and an auxiliary pad which is carried by a delicate spring secured to the main pad. Bow-springs embodying the present invention are best adapted for use in eyeglasses having these anatomical guards; but I desire to have it understood that in its broadest aspect the invention is not limited thereto.

Throughout the specification and claims in using such terms as "horizontal," "vertical," &c., it is assumed that the general plane of the lenses is vertical and that the geometrical centers of their broad faces lie in the same horizontal plane, and such terms are to be construed as including approximations.

Having described my invention, what I claim as new therein, and desire to secure by Letters Patent, is—

1. As a new article of manufacture, a pair of eyeglasses having in combination a pair of lenses, a pair of boxes open at top, and a bow-spring having a horizontal intermediate portion with flat vertical faces, said intermediate portion being located in a horizontal plane above the horizontal plane of the boxes and being located also in front of the vertical plane of the lenses, said spring having beyond said intermediate portion portions which proceed rearward and beyond these other portions which proceed downward in the vertical plane of the lenses and enter the tops of the boxes, substantially as described.

2. As a new article of manufacture, a pair of eyeglasses having in combination a pair of lenses, a pair of boxes open at top, and a bow-spring having a horizontal intermediate portion with flat vertical faces whereby it is adapted to bend horizontally, while, at the same time, it is practically rigid vertically, said spring having also depending end portions that lie in the vertical plane of the lenses and enter the boxes at top, the spring being bent rearward and twisted between the extremities of said intermediate portion and the boxes so as to bring the broad faces of the depending end portions into planes perpendicular with the vertical plane of said intermediate portion, substantially as described.

3. As a new article of manufacture, a pair of eyeglasses having in combination a pair of lenses, a pair of boxes open at top, a bow-spring having a horizontal intermediate portion with flat vertical faces whereby it is adapted to bend horizontally, while, at the same time, it is practically rigid vertically, said spring having beyond said intermediate portion portions that proceed rearward and beyond these end portions that lie in the vertical plane of the lenses and enter said boxes at top, and rearwardly-offset anatomical guards secured to the posts, substantially as described.

4. As a new article of manufacture, a pair of eyeglasses having in combination boxes open at top, a bow-spring having a flat intermediate portion which is straight when viewed from in front, said intermediate portion being located in a horizontal plane above the horizontal plane of the boxes and in front of the vertical plane of the lenses and being slightly curved as viewed from above, said spring having beyond said intermediate portion twisted portions extending first rearward, then inward and then downward, entering the tops of the boxes, substantially as shown and described.

PERCY Z. McDONALD.

Witnesses:
CHARLES A. JENSER,
L. M. HOPKINS.